US010286303B2

(12) United States Patent
Kashima et al.

(10) Patent No.: US 10,286,303 B2
(45) Date of Patent: May 14, 2019

(54) GAME SYSTEM, GAME PROGRESSING METHOD, AND COMPUTER APPARATUS

(71) Applicants: SQUARE ENIX CO., LTD., Tokyo (JP); GREE, Inc., Tokyo (JP)

(72) Inventors: Naoya Kashima, Tokyo (JP); Yoshihisa Akashi, Tokyo (JP); Natsuko Kushida, Tokyo (JP); Robin Boucher, Tokyo (JP)

(73) Assignees: SQUARE ENIX CO., LTD., Tokyo (JP); GREE, INC., Tokyo (JP)

(*) Notice: Subject to any disclaimer, the term of this patent is extended or adjusted under 35 U.S.C. 154(b) by 0 days.

(21) Appl. No.: 15/698,094

(22) Filed: Sep. 7, 2017

(65) Prior Publication Data

US 2018/0071619 A1    Mar. 15, 2018

(30) Foreign Application Priority Data

Sep. 14, 2016  (JP) .................................. 2016-179938

(51) Int. Cl.
| | |
|---|---|
| *A63F 13/219* | (2014.01) |
| *G06F 3/01* | (2006.01) |
| *A63F 13/26* | (2014.01) |
| *G02B 27/01* | (2006.01) |
| *A63F 13/822* | (2014.01) |
| *G06F 3/03* | (2006.01) |
| *G06F 3/0346* | (2013.01) |

(52) U.S. Cl.
CPC ............ *A63F 13/219* (2014.09); *A63F 13/26* (2014.09); *A63F 13/822* (2014.09); *G02B 27/017* (2013.01); *G06F 3/011* (2013.01); *G06F 3/0304* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 2005/0054402 A1* | 3/2005 | Noguchi ................. | A63F 13/10 463/5 |
| 2009/0017908 A1* | 1/2009 | Miyamoto .............. | A63F 13/10 463/31 |
| 2015/0352437 A1 | 12/2015 | Koseki et al. | |

FOREIGN PATENT DOCUMENTS

JP         2015-232783         12/2015

* cited by examiner

*Primary Examiner* — Damon J Pierce
(74) *Attorney, Agent, or Firm* — Greenblum & Bernstein, P.L.C.

(57) ABSTRACT

A game system including a display device used by being mounted on the head of a player and a controller, comprising: a first direction specifier that specifies direction and/or position of the display device; a second direction specifier that specifies direction of the controller; a displayer that displays on the display device, a state of a virtual space where a game is in progress, according to the direction and/or the position specified by the first direction specifier and a plurality of first options; a first selector that selects at least one first option from the plurality of first options, according to a relative relationship between the direction of the display device and the direction of the controller; and a game progressor that causes the game to progress according to the selected first option.

12 Claims, 8 Drawing Sheets

GAME SYSTEM, GAME PROGRESSING METHOD, AND COMPUTER APPARATUS

CROSS REFERENCE TO RELATED APPLICATION

The present disclosure relates to subject matter contained in Japanese Patent Application No. 2016-179938, filed on Sep. 14, 2016, the disclosure of which is expressly incorporated herein by reference in its entirety.

BACKGROUND OF THE INVENTION

Field of the Invention

The present invention relates to a game system using a display device mounted on a head of a player, a game progressing method, and a computer device.

Description of Related Art

In recent years, attention has been drawn to a virtual reality (VR) technique using a head mount display and the like in the game industry. For example, an image of the virtual world in a game is displayed on the head mount display, thereby the user can feel the virtual world as if it is a real world, and the sense of immersion can be enhanced in the game. Therefore, the VR technique is expected as a technique for improving taste of a game.

However, it is difficult to see the real world, with the head mount display mounted, so there is a problem that it is difficult to recognize the position of the controller. In order to solve such a problem, for example, JP-A-2015-232783 proposes a technique of displaying the position of a real controller so as to correspond to the position of the controller in a real world, on the image of a virtual world displayed on a head mount display.

SUMMARY OF THE INVENTION

Technical Problem

However, JP-A-2015-232783 is intended to improve the usability in the case where the user holds and operates the controller, and is not intended to add new taste to the game using the VR technique.

An object of at least one embodiment of the present invention is to provide a game system, a game progressing method, and a computer device, which are capable of improving taste of a game using the VR technique.

Solution to Problem

According to a non-limiting aspect, a game system comprising a display device used by being mounted on the head of a player and a controller, including: a first direction specifier that specifies direction and/or position of the display device; a second direction specifier that specifies direction of the controller; a displayer that displays on the display device, a state of a virtual space where a game is in progress, according to the direction and/or the position specified by the first direction specifier and a plurality of first options; a first selector that selects at least one first option from the plurality of first options, according to a relative relationship between the direction of the display device and the direction of the controller; and a game progressor that causes the game to progress according to the selected first option.

According to a non-limiting aspect, a game progressing method executed in a game system comprising a display device used by being mounted on the head of a player and a controller, including: a first direction specifying step of specifying direction and/or position of the display device; a second direction specifying step of specifying direction of the controller; a display step of displaying on the display device, a state of a virtual space where a game is in progress, according to the direction and/or the position specified in the first direction specifying step and a plurality of first options; a first selection step of selecting at least one first option from the plurality of first options, according to a relative relationship between the direction of the display device and the direction of the controller; and a game progressing step of causing the game to progress according to the selected first option.

According to a non-limiting aspect, a computer device capable of being connected to a display device used by being mounted on the head of a player and a controller by communication, including: a first direction specifier that specifies direction and/or position of the display device; a second direction specifier that specifies direction of the controller; a displayer that displays on the display device, a state of a virtual space where a game is in progress, according to the direction and/or the position specified by the first direction specifier and a plurality of first options; a first selector that selects at least one first option from the plurality of first options, according to a relative relationship between the direction of the display device and the direction of the controller; and a game progressor that causes the game to progress according to the selected first option.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings.

Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

Figure 1A:
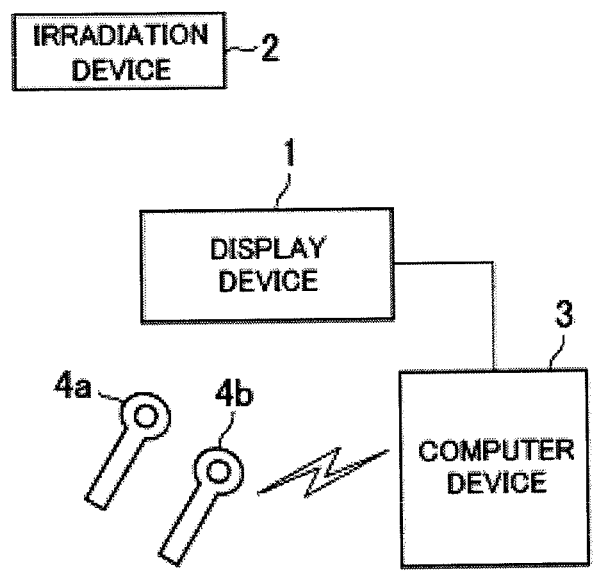
FIGS. 1A and 1B are block diagrams showing a configuration of a system corresponding to at least one of the embodiments of the present invention.
Figure 1B:
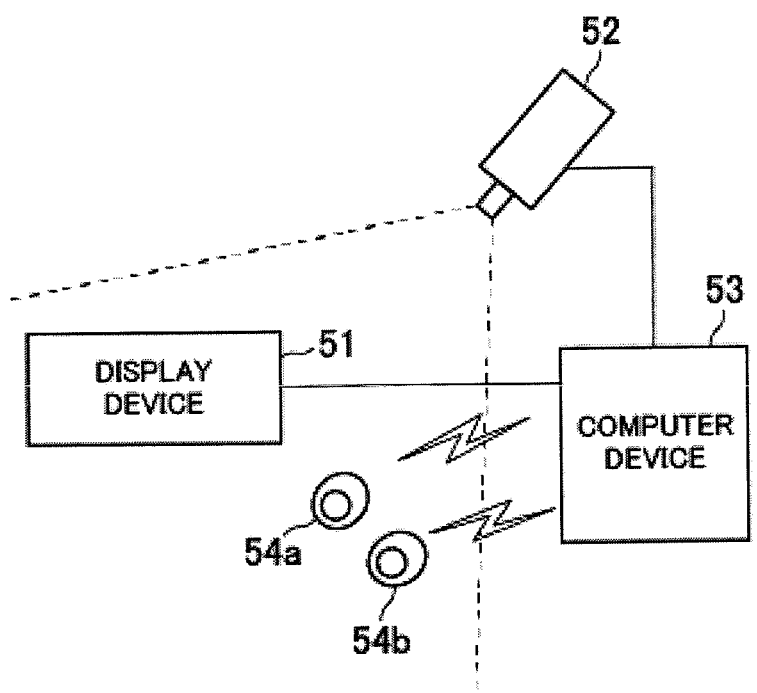

An overview of embodiments of the present invention will be described. FIGS. 1A and 1B are block diagrams showing a configuration of a system corresponding to at least one of the embodiments of the present invention.

FIG. 1A is a diagram showing one example relating to the configuration of the system. The system includes a display device 1 equipped with a sensor, an irradiation device 2 that irradiates a light beam, a computer device 3 that generates or processes an image to be displayed on the display device 1, and a controller 4 equipped with a sensor.

The display device 1 is preferably a goggle-type display device to be mounted on the head so as to cover the field of view. The display may be a transmissive display having a high transmittance or a non-transmissive display having a low transmittance. In addition, the display device 1 can specify the user's posture by using a plurality of mounted sensors. The configuration of the display device 1 will be described later.

The irradiation device 2 is a device that irradiates a laser beam in a wide range. If the periphery of the irradiation device 2 is irradiated with a laser beam, the laser beam is sensed by optical sensors, which are mounted on the display device 1 and the controller 4, and the positions of the display device 1 and the controller 4 are specified. This position specifying method is called "Lighthouse method". In order to specify the position more accurately, it is preferable that at least two irradiation devices 2 are provided with a predetermined interval.

The computer device 3 can be connected to the display device 1 and the controller 4 by communication. Communication may be performed in a wired or wireless manner. The computer device 3 may be a device independent from the display device 1, or may be an integrated device incorporated in the display device 1.

The controller 4 is an input device that includes a button and a trigger, and receives an input by a user's operation. In addition, the controller 4 is equipped with an optical sensor which is able to sense the laser beam irradiated from the irradiation device 2. Furthermore, the controller 4 is equipped with a touch sensor which is able to receive an input by a user's touch. The controller 4 is used in pairs by being held with the left and right hands, but only one of them may be used.

FIG. 1B is a diagram showing one example relating to the configuration of a system different from the system shown in FIG. 1A. The system shown in FIG. 1B includes a display device 51 having a light emitting unit as a light source, an imaging device 52 that captures an image of light emitted from the light emitting units which are light sources of the display device 51 and a controller 54, a computer device 53 that generates or processes an image to be displayed on the display device 51, and the controller 54 having a light emitting unit as a light source.

The display device 51 is preferably a goggle-type display device to be mounted on the head so as to cover the field of view, similar to the display device 1. The display may be a transmissive display having a high transmittance or a non-transmissive display having a low transmittance.

The imaging device 52 is a device that specifies the positions of the display device 51 and the controller 54 by capturing an image of light emitted from the light emitting units which are light sources of the display device 51 and the controller 54.

The computer device 53 can be connected to the display device 51 and the controller 54 by communication. Communication may be performed in a wired or wireless manner.

The controller 54 is an input device that has a button and receives an input by a user's operation. The controller 54 also has a light emitting unit which is a light source, and the imaging device 52 captures an image of light emitted from the controller 54 to specify the position of the controller 54. The controller is to be held with hand, and it is preferable to use the controller as a pair, but one controller may be used.

In the following description, in the embodiment of the present invention, it is assumed that the positions of the display device 1 and the controller 4 are specified by the system shown in FIG. 1A. However, the present invention is not limited to the system. For example, it may be the system shown in FIG. 1B or a system in which the display device is mounted on a body part other than the head, and the positions of the display device 1 and the controller 4 are specified.

The image displayed on the display device 1 is an image generated or processed by the computer device 3, based on a value measured by the sensor mounted on the display device 1 and a user's input operation to the controller 4.

Figure 2:
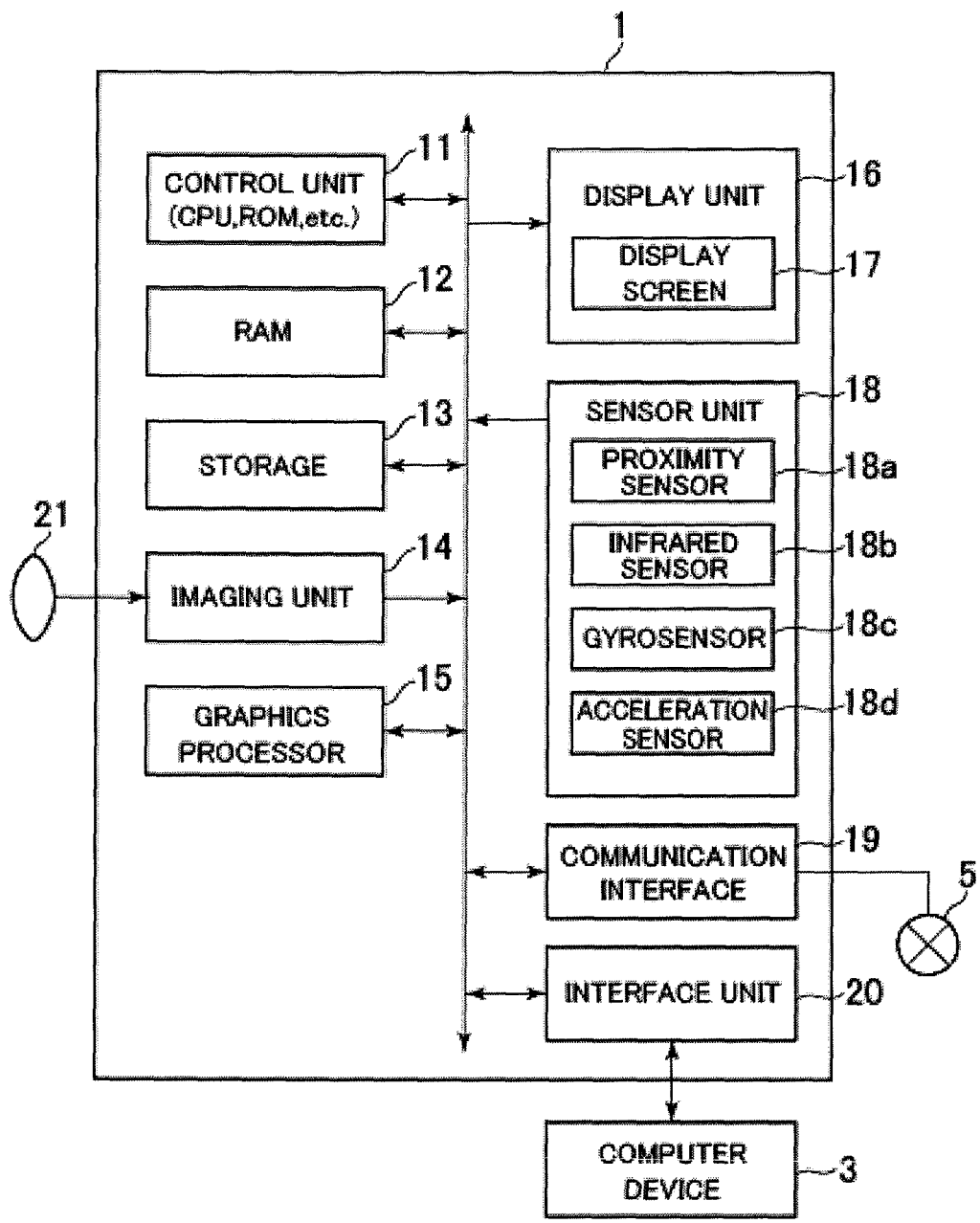
FIG. 2 is a block diagram showing a configuration of a display device corresponding to at least one of the embodiments of the present invention.

Here, the configuration of the display device 1 will be described. FIG. 2 is a block diagram showing a configuration of a display device corresponding to at least one of the embodiments of the present invention. The display device 1 includes a control unit 11, a Random Access Memory (RAM) 12, a storage 13, an imaging unit 14, a graphics processor 15, a display unit 16, a sensor unit 18, a communication interface 19, an interface unit 20, and a lens 21, and these components are connected to each other by an internal bus.

The control unit 11 is configured to include a Central Processing Unit (CPU) and a Read Only Memory (ROM). The control unit 11 executes a program stored in the storage 13 so as to control the display device 1. The RAM 12 is a work area of the control unit 11. The storage 13 is a storage area for storing programs and data.

The control unit 11 performs processing by reading programs and data from the RAM 12 and the storage 13. The control unit 11 processes the program and data which are loaded in the RAM 12, thereby output a drawing command to the graphics processor 15. Further, the control unit 11 performs processes based on various values measured by the sensor unit 18, or transmits data to the computer device 3 through the interface unit 20.

The imaging unit 14 outputs an image captured through the lens 21 to the graphics processor 15. In a case where the display device 1 is mounted on the head and the field of view is covered, information on the outside of the device cannot be checked. Therefore, by displaying information captured by the imaging unit 14 on a display screen 17 of the display unit 16, which will be described later, the user can recognize the real space and thus the safety can be secured.

The graphics processor 15 executes drawing of one image in the unit of frames. One frame time for the image is, for example, 1/30 seconds. The graphics processor 15 has a function of receiving a part of a calculation process relating to the drawing performed only by the controller to disperse a load of the entire system.

The display unit 16 has the display screen 17, and is provided inside the goggle of the display device 1 covering the user's field of view. For example, an organic EL or an inorganic EL is used as the display screen 17, but the present invention is not limited to these.

The sensor unit 18 includes at least a proximity sensor 18a, an infrared sensor 18b, a gyrosensor 18c, and an acceleration sensor 18d. The proximity sensor 18a is provided in the goggle portion of the display device 1, and is used for determining the presence or absence of contact with the user's face. A plurality of infrared sensors 18b are provided in the display device 1, and are used to specify the position of the display device 1 by detecting light beams irradiated from the irradiation device 2. The gyrosensor 18c and the acceleration sensor 18d are used for specifying the user's posture.

Figure 3:
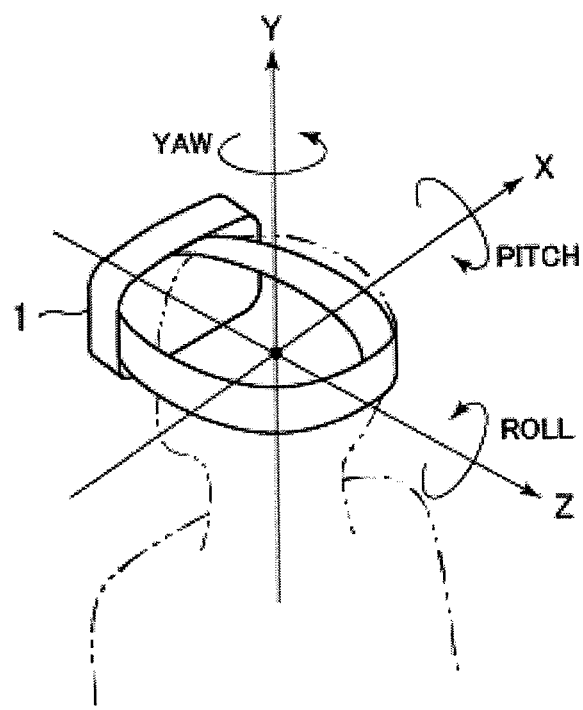
FIG. 3 is a diagram showing a Cartesian coordinate system for specifying the user's posture in a case where the display device is mounted on the head, corresponding to at least one of the embodiments of the present invention.

Here, a method of specifying a user's posture will be described with reference to the drawings. FIG. 3 is a diagram showing a Cartesian coordinate system for specifying the user's posture in a case where the display device is mounted on the head, corresponding to at least one of the embodiments of the present invention.

As shown in FIG. 3, the XYZ-coordinates are defined around the head of the user wearing the display device 1. A vertical direction in which the user stands upright is defined as a Y-axis (yaw angle), a direction which is orthogonal to the Y-axis and connects the center of the display screen 17 of the display device 1 and the head of the user is defined as a Z-axis (roll angle), and a direction orthogonal to the Y-axis and the Z-axis is defined as an X-axis (pitch angle). The gyrosensor 18c detects the angle (inclination) around each axis, and the acceleration sensor 18d detects the movement of the display device 1. The image to be displayed on the display screen 17 is changed according to the detected angle and the detected movement. The display device 1 can specify the user's posture, using values measured by a plurality of sensors (hereinafter referred to as posture information).

Subsequently, the communication interface 19 can be connected to a communication network 5 in a wireless or wired manner, and may receive data via the communication network 5. The data received via the communication interface 19 is loaded into the RAM 12, and is subjected to calculation processing by the control unit 11.

The interface unit 20 is mainly connected to the computer device 3, and can receive data such as images processed or generated by the computer device 3. Further, it is also possible to transmit measured values of various sensors acquired by the sensor unit 18 to the computer device 3.

Figure 4:
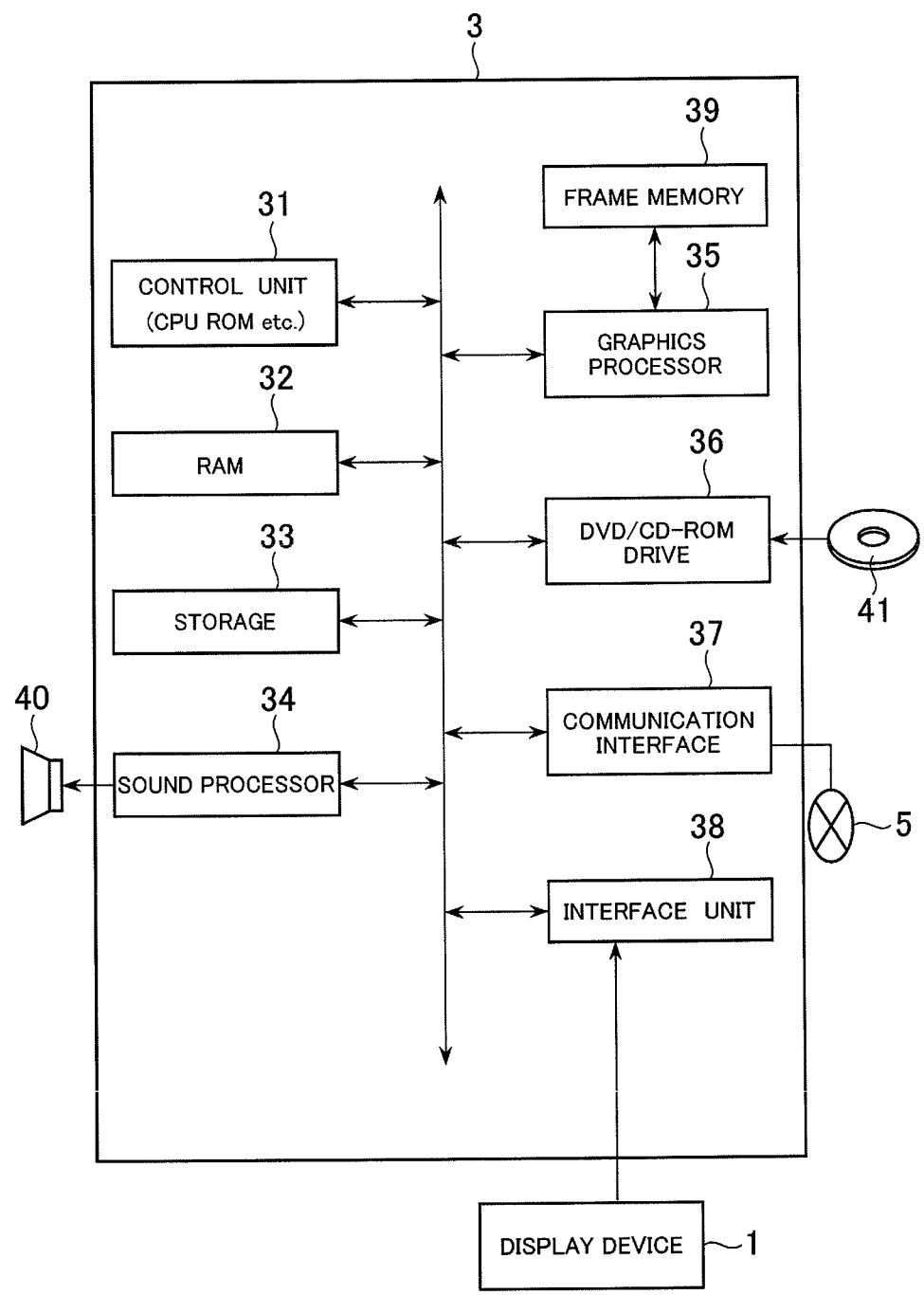
FIG. 4 is a block diagram showing a configuration of a computer device corresponding to at least one of the embodiments of the present invention.

Subsequently, the computer device 3 will be described. FIG. 4 is a block diagram showing a configuration of a computer device corresponding to at least one of the embodiments of the present invention. The computer device 3 includes a control unit 31, a RAM 32, a storage 33, a sound processor 34, a graphics processor 35, a DVD/CD-ROM drive 36, a communication interface 37, an interface unit 38, and a frame memory 39, and these components are connected to each other by an internal bus.

The control unit 31 is configured to include a CPU and a ROM. The control unit 31 executes a program stored in the storage 33 so as to control the computer device 3. The RAM 32 is a work area of the control unit 31. The storage 33 is a storage area for storing programs and data.

The control unit 31 performs processing by reading programs and data from the RAM 32. The control unit 31 processes the program and data loaded in the RAM 32 to output a drawing command to the graphics processor 35.

The sound processor 34 is connected to a sound output device 40. When the control unit 31 outputs a sound output instruction to the sound processor 34, the sound processor 34 outputs a sound signal to the sound output device 40. The sound output device 40 is, for example, a headphone, and the user may mount it on the head together with the display device 1, or the speaker may be incorporated in the display device 1.

The graphics processor 35 executes drawing of one image in the unit of frames. One frame time for the image is, for example, 1/60th second. The graphics processor 35 has a function of receiving a part of a calculation process relating to the drawing performed only by the controller to disperse a load of the entire system. Since the graphics processor 35 of the computer device 3 generates an image to be displayed on the display screen 17, based on the position information and the posture information of the display device 1 and the position information of the controller 4, it requires higher performance than the graphics processor 15 included in the display device 1.

The DVD/CD-ROM drive 36 reads data from a disc 41, loads the data into the RAM 32, and the control unit 31 performs a calculation process. The type of the disc 41 is not limited to the DVD or the CD, but may be a Blu-ray (registered trademark) disc or other standards.

The communication interface 37 can be connected to the communication network 5 in a wireless or wired manner, and may receive data via the communication network 5. The data received via the communication interface 37 is loaded into the RAM 32 in the same manner as the data read from the disc 41, and is subjected to calculation processing by the control unit 31.

The interface unit 38 is mainly connected to the display device 1, and can transmit data such as images processed or generated by the computer device 3.

In the above description, the display device 1 and the computer device 3 are described as separate devices, but all of the processes of the computer device 3 may be performed by the display device 1. In that case, the computer device 3 is not required, and the controller 4 is connected to the display device 1 by communication.

Subsequently, the program execution process according to the embodiment of the present invention will be described. An example of the embodiment of the present invention is a game in which a player performs virtual battle with an enemy character in a virtual world, and if cards to be owned by a player is selected, the action of a player character is determined, and the virtual battle progresses. The player may operate a single player character, or a team composed of a plurality of player characters. The card owned by the player is stored in the player account directly or in association with the player character.

Figure 5A:
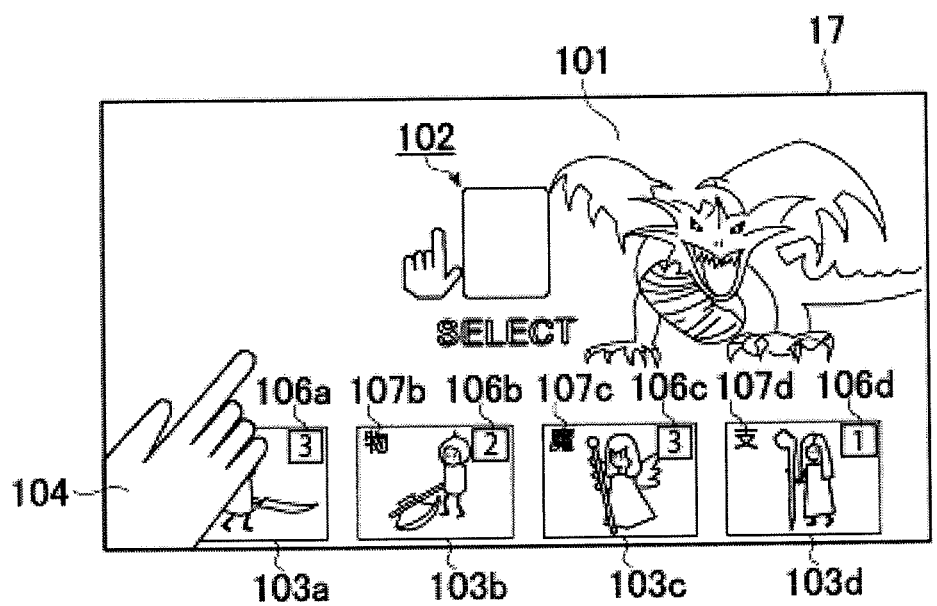
FIGS. 5A and 5B are examples of a game execution screen, corresponding to at least one of the embodiments of the present invention.
Figure 5B:
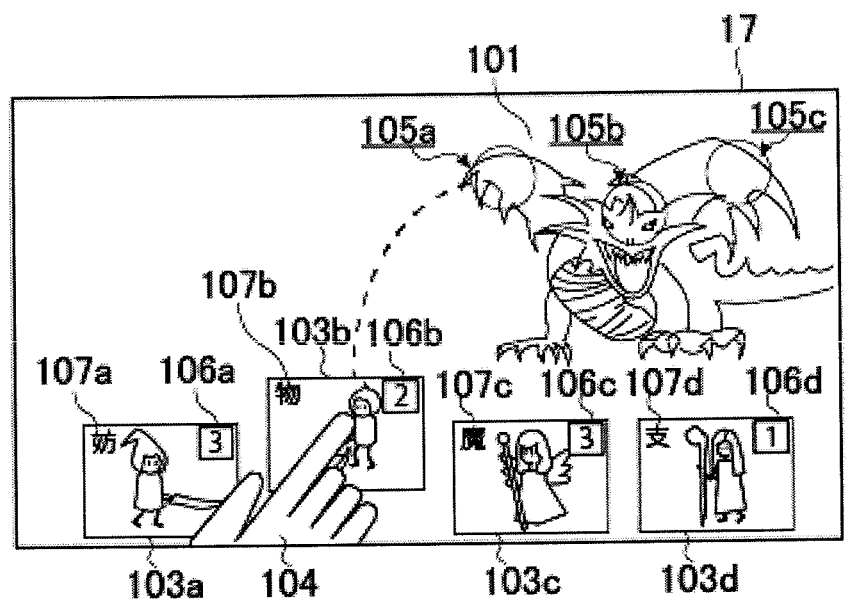

FIGS. 5A and 5B are examples of a game execution screen, corresponding to at least one of the embodiments of the present invention. In FIG. 5A, on the display screen 17, the status of the virtual battle is displayed, and an enemy character 101, system instruction information 102 and a player character are usable by the player, and at least a card group 103 usable by a player character and imitating a plurality of characters, which is an option to be selected by the player, and a hand portion 104 of the player in the virtual world are displayed. Although not shown, the player character has a value representing the physical strength of the player character (hereinafter referred to as a physical strength value), and when the physical strength value disappears, the player character becomes a battle impossible state and the game ends. A character that can be used by the player character can be set in the deck in advance as a character to participate in the virtual battle from the plurality of characters owned by the player. The physical strength value of the player character can be determined based on, for example, the physical strength value of each character set in the deck. In addition, when the life force (not shown) of the enemy character 101 disappears, the enemy character becomes a battle impossible state, it is determined that the player has won, and the game ends.

Cards 103a to 103d contain costs 106a to 106d representing the weights for using the drawn characters and actions 107a to 107d representing the types of actions of the characters. As the action 107, for example, characters such as "magic" in the case of a magic attack on the enemy character and "support" in the case of support magic which increases the offensive power of the player character are displayed. The virtual battle in the embodiment of the present invention progresses, by the player and the enemy performing actions such as attack, magic, or recovery for a predetermined number of times every turn. By comparing the value of the cost 106 set in the character with the upper limit of the cost set for each turn, it is determined whether or not the character selected by the player is allowed to act. In addition, the player can select and activate a plurality of characters in one turn. If the total value of the cost 106 set for each of the selected plurality of characters does not exceed the upper limit of the cost set for each turn, it is determined that actions of these characters are possible.

Specifically, in a case where the upper limit of the cost set for a certain turn is 4, when trying to activate the card 103a (cost is 3) and the card 103b (cost is 2), the total cost of the cards 103a and 103b is 5 and exceeds 4 which is the upper limit of the set cost, so it is determined that the action is impossible. The upper limit of the cost set for the turn may be increased in a case where the story of the game progresses, or may be increased as the number of turns during the virtual battle increases. By doing as described above, it becomes necessary to determine a timing when the character with large cost is activated, so it is possible to provide a more strategic game.

The upper limit of the cost can be changed every turn. The upper limit of the cost may be set at random every turn, or may be changed every turn according to a predetermined rule. As an example, the upper limit of the cost may be increased by a predetermined value (for example, one each time or the same value as the number of turns) every time one turn passes. For example, in a case where the battle with the enemy character is started and the upper limit of the cost of the first turn is 4, the upper limit of the cost of the second turn is 5, and the upper limit of the cost of the third turn is 6.

By operating the controller 4, the player instructs the player character in the virtual world to take action. The operation of the controller 4 is, for example, an operation of changing the position and inclination of the controller 4, or a pressing or touching operation with respect to a button or the like of the controller 4. By using change information on the position and inclination of the controller 4 as input information, the player can perform an intuitive operation and can concentrate more on the game.

Next, a method of selecting an object to be selected by the player in the embodiment of the present invention will be described. As a premise, when the program is executed, the control unit 31 of the computer device 3 causes the graphics processor 35 to output a virtual space defined by the program. Further, the position of the player wearing the display device 1 on the head, and the position of the controller 4 are specified based on the position and direction in which the light beam irradiated from the irradiation device 2 is received. Furthermore, the posture of the display device 1 is specified, based on the measured values of various sensors of the sensor unit 18 of the display device 1.

Figure 6:
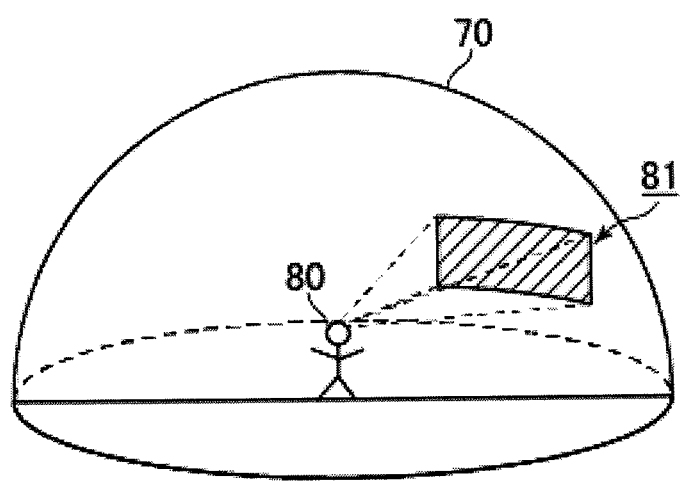
FIG. 6 is a diagram showing a concept of a virtual space, corresponding to at least one of the embodiments of the present invention.

The virtual space defined by the program will be described. FIG. 6 is a diagram showing a concept of a virtual space, corresponding to at least one of the embodiments of the present invention. In a case where a virtual space 70 defined by the program is represented by a hemispherical space as shown, the field of view of a player 80 wearing the display device 1 on the head corresponds to a visible region 81. That is, an image corresponding to the visible region 81 is displayed on the display screen 17 of the display device 1. For example, when the player 80 turns to the left, the visible region 81 moves to the left side according to the movement of the player 80. Similarly, for the vertical direction, for example, when the player 80 turns upward, the visible region 81 moves upward according to the movement of the player 80.

Figure 7:
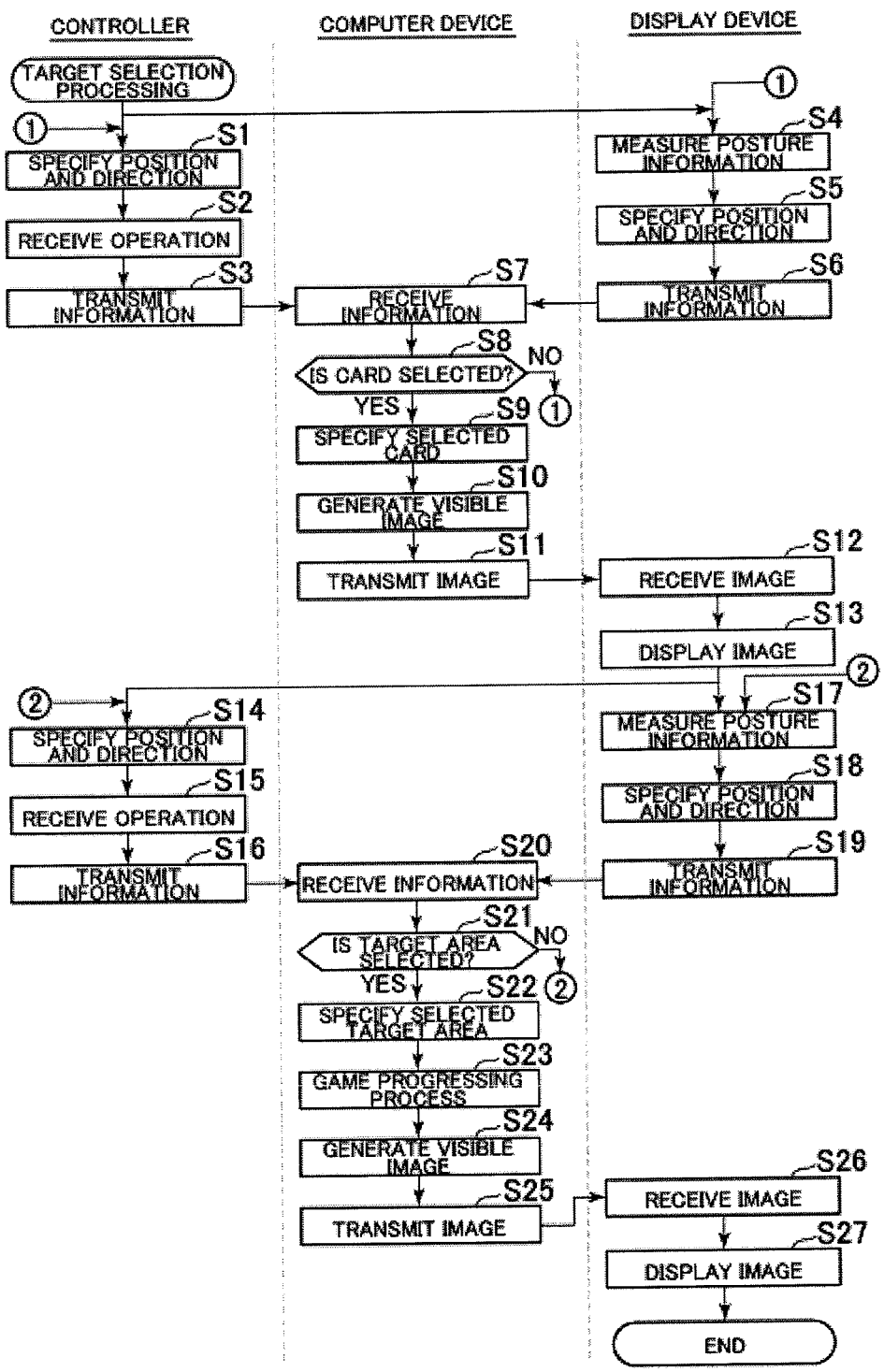
FIG. 7 is a flowchart of a program execution process, corresponding to at least one of the embodiments of the present invention.

FIG. 7 is a flowchart of a program execution process, corresponding to at least one of the embodiments of the present invention. First, the optical sensor mounted on the controller 4 senses the laser beam irradiated from the irradiation device 2, and specifies the position and direction of the controller 4 (step S1). The process of step S1 may be performed at predetermined intervals and the results may be transmitted to the computer device 3 for every measurement or specification and a display image to be displayed on the display screen 17 of the display device 1 may be generated.

Next, the controller 4 receives an operation instruction from the player (step S2). The operation instruction is, for example, pressing of a button of the controller 4 or clicking of a trigger. The information on the position and direction specified in step S1 and the operation information received in step S2 are transmitted to the computer device 3 (step S3).

Meanwhile, the display device 1 measures the posture information (step S4). The posture information is measured by various sensors included in the sensor unit 18 of the display device 1. Next, the optical sensor mounted on the display device 1 senses the laser beam irradiated from the irradiation device 2, and specifies the position and direction of the display device 1 (step S5).

The posture information measured in step S4 and the information on the position and direction specified in step S5 are transmitted to the computer device 3 (step S6). The process of steps S4 and S5 may be performed at predetermined intervals and the results may be transmitted to the computer device 3 for every measurement or specification and a display image to be displayed on the display screen 17 of the display device 1 may be generated.

The computer device 3 receive information from the display device 1 and the controller 4 (step S7), it is determined whether or not a predetermined number of cards have been selected from the card group 103 displayed on the display screen 17, based on the information on the position and direction of the controller 4 specified in step S1, the operation information received in step S2, the posture information of the display device 1 measured in step S4, and the information on the position and direction of the display device 1 specified in step S5 (step S8).

Whether or not a card is selected is determined based on the information on the position and direction of the display device 1 and the direction of the controller 4. In this specification, the position and direction of the display device 1 are concepts including the position and direction of the player character in the virtual space corresponding to the position and direction of the display device 1. Further, the direction of the controller 4 is a concept including the direction in the virtual space corresponding to the direction of the controller 4.

Figure 8A:
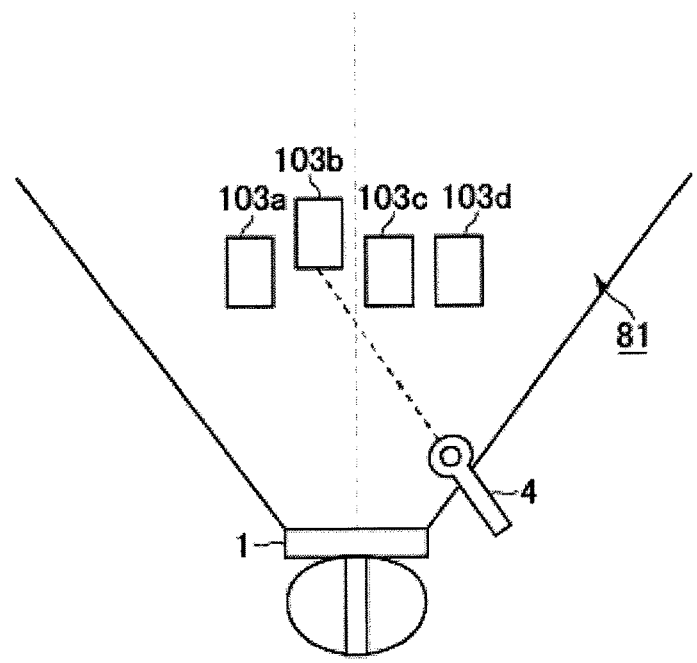
FIGS. 8A and 8B are conceptual diagrams for describing the selection of an object, corresponding to at least one of the embodiments of the present invention.
Figure 8B:
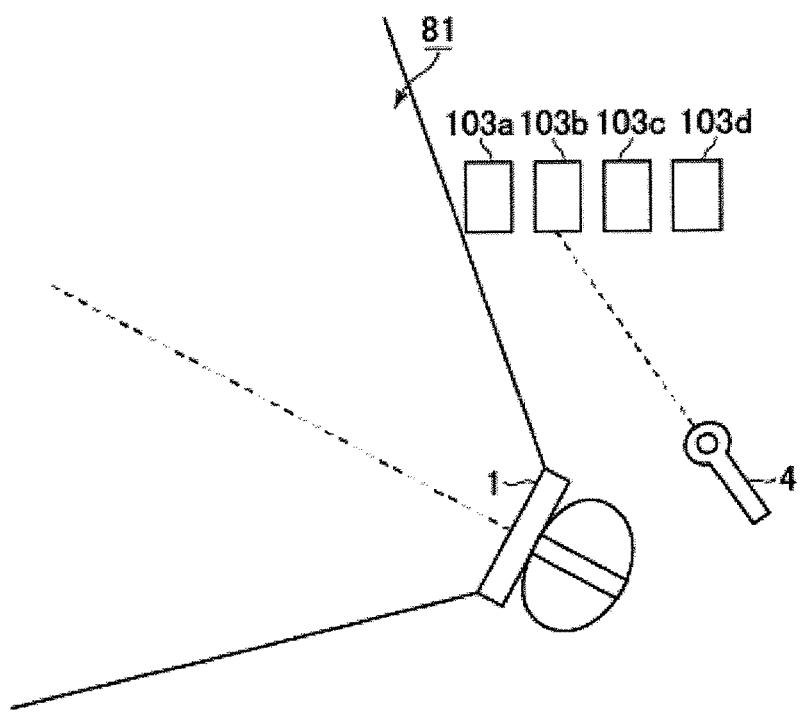

FIGS. 8A and 8B are conceptual diagrams for describing the selection of an object, corresponding to at least one of the embodiments of the present invention. FIG. 8A is a diagram showing a situation in which the visible region 81 of the display device 1 includes the card group 103. In a case where the card group 103 is included in the visible region 81, and the direction of the controller 4 is oriented toward one of the cards in the displayed card group 103, if an operation instruction from the player to the controller 4 is received, it is determined that the card is selected. Not only the direction of the controller 4 but also the position information may be used.

FIG. 8B is a diagram showing a situation in which the visible region 81 of the display device 1 does not include the card group 103. As shown in FIG. 8B, in a situation where the card group 103 is not included in the visible region 81 of the display device 1, even if the direction of the controller 4 selects the card 103b, it is not determined that the card 103b is selected. In this manner, selection processing is performed according to the relative positional relationship and directions of the display device 1 and the controller 4.

In the illustrated example, the card group 103 is present at a fixed position, but the aspect of the present invention is not limited thereto. That is, the position of the card group 103 may be changed according to the direction of the display device 1. In this case, the position of the card group 103 is controlled so as to always be included in the visible region 81, and the player can always see the card group 103.

In step S8, in a case where a card is selected (YES in step S8), the selected card is specified (step S9). When the card is specified, the player can further select and specify the card within a range in which the total value of the costs set for the plurality of cards does not exceed the upper limit of the cost set for the turn. In this case, the process from step S1 to step S9 is repeatedly executed. Further, it is also possible to perform switching to a different target from the card, as a target selected by the player.

Next, a visible image to be displayed on the display screen 17 is generated (step S10). The visible image may be, for example, an image obtained by adding effects such as floating up, glowing, or changing color to the selected card.

FIG. 5B shows a visible image after specifying the selected card in step S9. On the display screen 17, the enemy character 101, the card group 103 possessed by the player, the hand portion 104 of the player in the virtual world, and a target region 105 where the effect is to be generated are displayed. If the card 103b is selected, as shown in FIG. 5B, the card 103b is displayed so as to float above the other cards.

Further, the target region 105 may be set for each part of the enemy character to be attacked. Specifically, as shown in FIG. 5B, a target region 105a of the left wing of the enemy character 101, a target region 105b of the head of the enemy character 101, and a target region 105c of the right wing of the enemy character 101 are set. The player selects one of the target regions 105 as an attack target and causes the game to progress. Further, the target region 105 is not limited to the area, and may be a point.

Meanwhile, when the selected card is specified in step S9, the card 103b becomes an image (not shown) representing that the card 103b is grasped by the hand portion 104. When the controller 4 is moved, the card 103b follows the movement and also moves. In a case where the player continues the operation received in step S2, the card 103b may follow the movement of the controller 4, or the selection of the card 103b may be canceled by the player performing the operation performed in step S2 again.

If card is not selected in step S8 (NO in step S8), the position and direction of the controller 4 are specified again in step S1, and the posture information of the display device 1 is measured in step S4. In this case, as shown in FIG. 5A, the state where the system instruction information 102 prompting selection of a predetermined number of cards from the card group 103 is displayed is maintained.

The computer device 3 transmits the visible image generated in step S10 to the display device 1 (step S11). The display device 1 receives the visible image (step S12), and displays the received image on the display screen 17 (step S13).

When viewing the image displayed in step S13, the player selects an object to activate the effect corresponding to the selected card. In other words, in virtual battle, one of an enemy or an ally character is selected to have the effect corresponding to the selected card 103b. For example, the corresponding effect is such that in a card on which a character is drawn, the drawn character appears and attacks the selected object, or in a case on which magic or an item is drawn, the player character uses the magic or the item for the selected object.

In order to select the next action after selecting the card, first, as in step S1, the position and direction of the controller 4 are specified (step S14). Further, as in step S2, an operation instruction from the player to the controller 4 is received (step S15), information on the position and direction specified in step S14 and the operation information received in step S15 are transmitted to the computer device 3 (step S16).

Meanwhile, the posture information of the display device 1 is measured (step S17), the optical sensor mounted on the display device 1 senses the laser beam irradiated from the irradiation device 2, and specifies the position and direction of the display device 1 (step S18).

The posture information measured in step S17 and the information on the position and direction specified in step S18 are transmitted to the computer device 3 (step S19). The process of steps S17 and S18 may be performed at predetermined intervals and the results may be transmitted to the computer device 3 for every measurement or specification and a display image to be displayed on the display screen 17 of the display device 1 may be generated.

The computer device 3 receive information (step S20), it is determined whether or not the target region 105 displayed on the display screen 17 is selected, based on the information on the position and direction specified in step S14, the operation information received in step S15, the posture information of the display device 1 measured in step S17, and the information on the position and direction of the display device 1 specified in step S5 (step S21).

In a case where the target region 105 is selected (YES in step S21), an enemy or a part of an enemy corresponding to the target region 105 is specified (step S22), the game progresses according to the specified part (step S23), and a visible image relating to the progress and the result of the game is generated (step S24).

The generated visible image includes an image obtained as a result of selecting an enemy or parts of an enemy. That is, the visible image may be a moving image representing the progress leading to an effect corresponding to the card and the result of the effect, when adding effects such as protruding the card in the direction of the target region 105 and lighting the card, in a state where the hand portion 104 grasps the card specified in the step S9.

If the target region 105 is not selected (NO in step S21), the position and direction of the controller 4 are specified again in step S14, and the posture information of the display device 1 is measured in step S17. In this case, the process of steps S14 to S20 is repeated until the target region is selected in step S21.

The computer device 3 transmits the visible image generated in step S24 to the display device 1 (step S25). The display device 1 receives the visible image (step S26), displays the received image on the display screen 17 (step S27), and ends the process.

In the game, after the target is selected, at the timing of attack, the controller 4 may be used to detect the action of swinging down the sword by the player so as to attack the enemy. Further, when an attack is made at a predetermined timing, a special attack such as a deathblow may be activated, and the controller 4 may be made to vibrate so as to further enhance taste.

Examples of a game to which embodiments of the present invention can be applied include a game that a plurality of players cooperatively proceed, and a game for one person, and requiring not only a simple procedure but also a plurality of procedures. Although a card is selected and grasped in the above description, for example, a game in which the card is flipped (reversed) and applied to an object may be used. Alternatively, a game in which a card is flipped and an emerging picture is placed in an appropriate place, or a game in which if a card is flipped, a character which was waiting appears, and a target point to direct the character is defined may be used.

The game to which embodiments of the present invention can be applied may be a game using those other than a card, for example, a game such as picking up a sword and stabbing it, picking up an object, checking its shape, and throwing it to a target. Alternatively, a game such as grabbing a snowball and throwing it, like a snowball fight may be used.

In the embodiment of the present invention, the light beam for specifying the positions of the display device 1 and the controller 4 is a laser beam, for example, infrared ray, but the light beam is not limited to this, and the light beam may be a visible light beam or other invisible light beams.

As one aspect of the embodiment of the present invention, in the virtual world, a game progresses by performing a natural motion of manipulating the hand portion like a real hand of the player to grasp the card and strike the enemy character, thereby the player can immerse in the virtual world more.

As one aspect of the embodiment of the present invention, since a plurality of procedures are associated with each other, it is possible to increase the types of options to be selected by the player in a game to progress by selecting options, thereby enhancing taste.

In the embodiment of the present invention, examples of the "display device" includes a device called a head mount display (HMD). "Being mounted on the head" refers to covering the head like a hat, attaching to the face like eyeglasses, or attaching to other parts of the head, and it is a concept including a case extending from a part of the body to cover the head as well. "Direction" is a concept including not only the direction and angle of an object, but also the direction relating to a change amount per unit time such as acceleration. "Virtual space" is, for example, a space defined by programs and data, and is a virtual space generated by a computer.

In the embodiment of the present invention, the "option" means an object such as a card or an item that a player can select. "Relative relationship" means, for example, a relationship with respect to a relative position and direction, and is a concept including not only a distance but also an angle and a speed. "Switching" means, for example, changing a certain process to a different process. "Player account" means, for example, unique information for uniquely identifying a player in the system. "Irradiation device" is, for example, a device that irradiates light within a predetermined range, and it does not matter whether the range is narrow or wide. "Receiving light" refers to, for example, sensing light, and it may be sufficient to recognize that light has hit.

APPENDIX

The above embodiments have been described such that the following invention can be embodied by those who have ordinary knowledge in the field to which the invention belongs.

(1) A game system including a display device used by being mounted on the head of a player and a controller, comprising: a first direction specifier that specifies direction and/or position of the display device; a second direction specifier that specifies direction of the controller; a displayer that displays on the display device, a state of a virtual space where a game is in progress, according to the direction and/or the position specified by the first direction specifier and a plurality of first options; a first selector that selects at least one first option from the plurality of first options, according to a relative relationship between the direction of the display device and the direction of the controller; and a game progressor that causes the game to progress according to the selected first option.

(2) The game system according to (1), further comprising: a second selector that selects at least one second option from a plurality of second options, according to the relative relationship between the direction of the display device and the direction of the controller, after the first option is selected by the first selector; wherein the displayer further displays the plurality of second options on the display device, and wherein the game progressor causes the game to progress according to the selected first option and the selected second option.

(3) The game system according to (2), further comprising: a selection switcher that performs switching from a selection processing of the first option by the first selector to a selection processing of the second option by the second selector, according to an input by the player to the controller.

(4) The game system according to (2) or (3), wherein the first option is a first object associated with a player account, and wherein the second option is a second object that is impacted by the first object, when the game progresses.

(5) The game system according to any one of (1) to (4), wherein the displayer displays an aspect that a player character appearing in the game grasps the first option, when the first option is selected by the first selector.

(6) The game system according to any one of (2) to (5), wherein the displayer displays an aspect that the first option grasped by the player character is directed to the direction in which the selected second option is present, when the second option is selected by the second selector.

(7) The game system according to any one of (1) to (6), further comprising: an optical receiver provided at a predetermined position, wherein the display device includes an irradiator that irradiates a predetermined light beam, and wherein the first direction specifier specifies the direction of the display device, based on the light beam irradiated from the irradiator and received by the optical receiver.

(8) The game system according to any one of (1) to (6), further comprising: an irradiator which is provided at a predetermined position and irradiates a predetermined light beam, wherein the display device includes an optical receiver that receives a light beam, and wherein the first direction specifier specifies the direction of the display device, based on the light beam irradiated from the irradiator and received by the optical receiver.

(9) The game system according to any one of (1) to (7), further comprising: an optical receiver provided at a predetermined position, wherein the controller includes an irradiator that irradiates a predetermined light beam, and wherein the second direction specifier specifies the direction of the controller, based on the light beam irradiated from the irradiator and received by the optical receiver.

(10) The game system according to any one of (1) to (6) or (8), further comprising: an irradiator which is provided at a predetermined position and irradiates a predetermined light beam, wherein the controller includes an optical receiver that receives a light beam, and wherein the second direction specifier specifies the direction of the controller, based on the light beam irradiated from the irradiator and received by the optical receiver.

(11) A game progressing method executed in a game system including a display device used by being mounted on the head of a player and a controller, comprising: a first direction specifying step of specifying direction and/or position of the display device; a second direction specifying step of specifying direction of the controller; a display step of displaying on the display device, a state of a virtual space where a game is in progress, according to the direction and/or the position specified in the first direction specifying step and a plurality of first options; a first selection step of selecting at least one first option from the plurality of first options, according to a relative relationship between the direction of the display device and the direction of the controller; and a game progressing step of causing the game to progress according to the selected first option.

(12) A computer device capable of being connected to a display device used by being mounted on the head of a player and a controller by communication, comprising: a first direction specifier that specifies direction and/or position of the display device; a second direction specifier that specifies direction of the controller; a displayer that displays on the display device, a state of a virtual space where a game is in progress, according to the direction and/or the position specified by the first direction specifier and a plurality of first options; a first selector that selects at least one first option from the plurality of first options, according to a relative relationship between the direction of the display device and the direction of the controller; and a game progressor that causes the game to progress according to the selected first option.

REFERENCE SIGNS LIST

1 DISPLAY DEVICE
11 CONTROL UNIT
12 RAM
13 STORAGE
14 IMAGING UNIT
15 GRAPHICS PROCESSOR
16 DISPLAY UNIT
17 DISPLAY SCREEN
18 SENSOR UNIT
18a PROXIMITY SENSOR
18b INFRARED SENSOR
18c GYROSENSOR
18d ACCELERATION SENSOR
19 COMMUNICATION INTERFACE
2 IRRADIATION DEVICE
20 INTERFACE UNIT
21 LENS
3 COMPUTER DEVICE
4 CONTROLLER
5 COMMUNICATION NETWORK
31 CONTROL UNIT
32 RAM
33 STORAGE
34 SOUND PROCESSOR
35 GRAPHICS PROCESSOR
36 DVD/CD-ROM
37 COMMUNICATION INTERFACE
38 INTERFACE UNIT
39 FRAME MEMORY
40 SOUND OUTPUT DEVICE
41 DISC
51 DISPLAY DEVICE
52 IMAGING DEVICE
53 COMPUTER DEVICE
54 CONTROLLER

The invention claimed is:

1. A game system including a display device configured to be mounted on a head of a player and a controller, the game system comprising:
a first sensor that specifies a direction and/or a position of the display device;
a second sensor that specifies a direction of the controller;
the display device that displays a state of a virtual space where a game is in progress, according to the direction and/or the position of the display device, and a plurality of first options;
the controller that selects at least one first option from the plurality of first options, according to a relative relationship between the direction of the display device and the direction of the controller; and
a game processor that causes the game to progress according to the selected at least one first option,
wherein the controller further selects at least one second option from a plurality of second options, according to the relative relationship between the direction of the display device and the direction of the controller, after the at least one first option is selected,
wherein the display device further displays the plurality of second options,
wherein the game processor causes the game to progress according to the selected at least one first option and the selected at least one second option, and
wherein, when the at least one first option is selected, the selected at least one first option moves to follow a movement of the controller.

2. The game system according to claim 1,
wherein the controller further performs switching from a selection processing of the at least one first option to a selection processing of the at least one second option, according to an input received by the controller.

3. The game system according to claim 2,
wherein the at least one first option is a first object associated with a player account, and
wherein the at least one second option is a second object that is impacted by the first object, when the game progresses.

4. The game system according to claim 1,
wherein the at least one first option is a first object associated with a player account, and
wherein the at least one second option is a second object that is impacted by the first object, when the game progresses.

5. The game system according to claim 1,
wherein the display device displays an aspect that a player character appearing in the game grasps the first option, when the at least one first option is selected by the controller.

6. The game system according to claim 1,
wherein the display device displays an aspect that the at least one first option grasped by a player character is directed to a direction in which the selected at least one second option is present, when the at least one second option is selected by the controller.

7. The game system according to claim 1, further comprising:
an optical receiver provided at a predetermined position,
wherein the display device includes an irradiator that irradiates a predetermined light beam, and
wherein the first sensor specifies the direction of the display device, based on the light beam irradiated from the irradiator and received by the optical receiver.

8. The game system according to claim 1, further comprising:
an irradiator provided at a predetermined position and irradiates a predetermined light beam,
wherein the display device includes an optical receiver that receives a light beam, and
wherein the first sensor specifies the direction of the display device, based on the light beam irradiated from the irradiator and received by the optical receiver.

9. The game system according to claim 1, further comprising:
an optical receiver provided at a predetermined position,
wherein the controller includes an irradiator that irradiates a predetermined light beam, and
wherein the second sensor specifies the direction of the controller, based on the light beam irradiated from the irradiator and received by the optical receiver.

10. The game system according to claim 1, further comprising:
an irradiator provided at a predetermined position and irradiates a predetermined light beam,
wherein the controller includes an optical receiver that receives a light beam, and
wherein the second sensor specifies the direction of the controller, based on the light beam irradiated from the irradiator and received by the optical receiver.

11. A game progressing method executed in a game system including a display device configured to be mounted on a head of a player and a controller, the method comprising:
specifying a direction and/or a position of the display device;
specifying a direction of the controller;
displaying, on the display device, a state of a virtual space where a game is in progress, according to the direction and/or the position of the display device, and a plurality of first options;
selecting, via the controller, at least one first option from the plurality of first options, according to a relative relationship between the direction of the display device and the direction of the controller;
causing the game to progress according to the selected at least one first option;
selecting, via the controller, at least one second option from a plurality of second options, according to the relative relationship between the direction of the display device and the direction of the controller, after the at least one first option is selected;
displaying, on the display device, the plurality of second options; and
causing the game to progress according to the selected at least one first option and the selected at least one second option,
wherein, when the at least one first option is selected, the selected at least one first option moves to follow a movement of the controller.

12. A computer device connected, by communication, to a display device configured to be mounted on a head of a player and to a controller, the computer device comprising:
a first sensor that specifies direction and/or position of the display device;
a second sensor that specifies direction of the controller;
the display device that displays a state of a virtual space where a game is in progress, according to the direction and/or the position of the display device, and a plurality of first options;
the controller that selects at least one first option from the plurality of first options, according to a relative relationship between the direction of the display device and the direction of the controller; and
a game processor that causes the game to progress according to the selected at least one first option,
wherein the controller further selects at least one second option from a plurality of second options, according to the relative relationship between the direction of the display device and the direction of the controller, after the at least one first option is selected,
wherein the display device further displays the plurality of second options,
wherein the game processor causes the game to progress according to the selected at least one first option and the selected at least one second option, and
wherein, when the at least one first option is selected, the selected at least one first option moves to follow a movement of the controller.

* * * * *